United States Patent [19]

Slavenburg et al.

[11] Patent Number: 5,450,556
[45] Date of Patent: Sep. 12, 1995

[54] VLIW PROCESSOR WHICH USES PATH INFORMATION GENERATED BY A BRANCH CONTROL UNIT TO INHIBIT OPERATIONS WHICH ARE NOT ON A CORRECT PATH

[75] Inventors: Gerrit A. Slavenburg, Mt. View; Jean-Michel J. Labrousse, Palo Alto, both of Calif.

[73] Assignee: North American Philips Corporation, New York, N.Y.

[21] Appl. No.: 142,648

[22] Filed: Oct. 25, 1993

Related U.S. Application Data

[63] Continuation of Ser. No. 578,976, Sep. 5, 1990, abandoned.

[51] Int. Cl.⁶ .......................... G06F 15/16; G06F 9/28
[52] U.S. Cl. .................................. 395/375; 395/800;
364/931.4; 364/931.41; 364/931.42; 364/938;
364/938.1; 364/DIG. 2
[58] Field of Search ................ 395/375, 650, 800, 425

[56] References Cited

U.S. PATENT DOCUMENTS

| | | | |
|---|---|---|---|
| 3,611,306 | 10/1971 | Reigel et al. | 395/650 |
| 3,781,814 | 12/1973 | Deerfield et al. | 395/375 |
| 4,833,599 | 5/1989 | Colwell et al. | 395/375 |
| 4,920,538 | 4/1990 | Chan et al. | 395/375 |
| 4,943,912 | 7/1990 | Aoyama et al. | 395/650 |
| 5,050,068 | 9/1991 | Dollas et al. | 395/375 |
| 5,127,092 | 6/1992 | Gupta et al. | 395/375 |
| 5,179,680 | 1/1993 | Colwell et al. | 395/425 |
| 5,203,002 | 4/1993 | Wetzel | 395/800 |
| 5,313,551 | 5/1994 | Labrousse et al. | 395/425 |
| 5,355,460 | 10/1994 | Eickemeyer et al. | 395/375 |

OTHER PUBLICATIONS

DeGloria, "A Programmable Instruction Format Extension to VLIW Architectures", 1992, IEEE Computer. Soc. Press, (Abstract Only).
Labrousse et al, "A 500 MHZ Microprocessor with a Very Long Inst. Word Architecture"; 1990, IEEE International Solid-State Circuits Conference (Abstract Only).
Kemal Ebcioglu, "Some Design Ideas for a VLIW Architecture for Sequential-Natural Software"; 1988, Elsevier Science Publishers.
Abnous et al, "Special Features of a VLIW Architecture", Feb. 1991, Department of Electrical and Computer Engineering University of California, Irvine.
"A Programmable Instruction Format Extension to VLIW Architectures"; by Alexander De Gloria; IEEE, Mar. 1992, pp. 35–40.

Primary Examiner—Alyssa H. Bowler
Assistant Examiner—Meng-Ai T. An
Attorney, Agent, or Firm—Anne E. Barschall

[57] ABSTRACT

A highly parallel and pipelined computer processor such as a pipelined very long instruction word (VLIW) processor having a plurality of arithmetic and logic units (ALUs) which process computer operations in parallel to speed up the operation of the computer. Operations issued during the branch delay period following conditional jump operations are conditioned on the outcomes of the condition evaluation of such conditional jump operations that have not yet percolated through the instruction issue pipeline, by matching a field in the operation to path information generated by a branch control unit. Operations that succeed are allowed to proceed and the effects of unsuccessful operations are disabled. This allows a form of look-ahead computation after a conditional branch which is particularly attractive for a VLIW processor having a large number of parallel functional units and allows useful work to be done in the branch delay periods. Optionally, only such operations that affect the programmer-visible state of the computer are so conditioned, e.g., store operations to memory, program flow control operations and operations that raise exception conditions. The matching algorithm can be implemented such that an operation is enabled on a single path or on an arbitrary set of paths.

11 Claims, 5 Drawing Sheets

OTHER PUBLICATIONS

J. A. Fisher, IEEE Transactions on Computers, vol. C-30, pp. 478-490 Jul. 1981.

B. R. Rau et al, Proceedings of the 9th Annual International Symposium on Computer Architecture, pp. 131-139, 1982 "Efficient Code Generation for Horizontal Architectures".

K. Ebcioglu, Proceeding of the IFIP Working Conference on Parallel Processing, Pisa Italy, Apr. 1988, "Some Design Ideas for a VLIW Architecture for Sequential-Natured Software".

Gregory R. Andrews et al, Computer Surveys, vol. 15, No. 1, Mar. 1983 "Concepts and Notations for Concurrent Programming".

Technical Summary, Multiflow Computer, Inc., Jun. 23, 1987.

Peter Yan Tek Hsu, "Highly Concurrent Scalar Processing" University of Illinois at Urbana-Champaign, Jan. 1986.

Scott McFarling and John Hennessy, "Reducing the Cost of Branches" pp. 396-403, 1986 IEEE.

"Harp: A VLIW RISC Processor"; by P. A. Findlay et al; IEEE May 1991; pp. 368-372.

Harp: A Parallel Pipelined RISC Processor; G. B. Steven et al, Microprocessors and Microsystems, Nov., No. 9, London, GB.

Nicolau et al., "Rope: A Statically Scheduled Supercomputer Architecture", Proceedings 1st International Conference on Supercomputing Systems, Dec. 16, 1985 pp. 158-168.

R. D. Dowsing et al., "Programming a Bounded Buffer using the Object and Path Expression Constructs of Path Pascal", The Computer Journal, vol. 29, No. 5, 1986, pp. 423-429.

J. Basu et al., "Ordered Ports—a Language Concept for High-level Distributed Programming", The Computer Journal, vol. 30, No. 6, 1987, pp. 487-497.

E. W. Dijkstra et al., "Guarded Commands, Nondeterminacy and Formal Derivation of Programs", Programming Languages, T. A. Standish—Editor, pp. 453-457.

J. A. Fisher, Proceedings of the 10th Annual Symposium on Computer Architecture, Jun. 1983 "Very Long Instruction Word Architecture and the ELI-512".

R. P. Colwell et al, Proceedings of ASPLOS, 1987 "A VLIW Architecture for a Trace Scheduling Compiler".

P. Y.-T. Hsu, Thesis, University of Illinois at Urbana-Champaign, 1986.

S. Borkar et al, "iWarp: Integrated Solution to High Speed Parallel Computing", IEEE Proceedings on Supercomputing, pp. 330-339, 1988 Catalog #88CH2617-9.

R. M. Tomasulo, "An Efficient Algorithm for Exploiting Multiple Arithmetic Units", IBM Journal of Research and Development, vol. 11, pp. 25-33, Jan. 1967.

VERY LONG INSTRUCTION WORD ARCHITECTURE

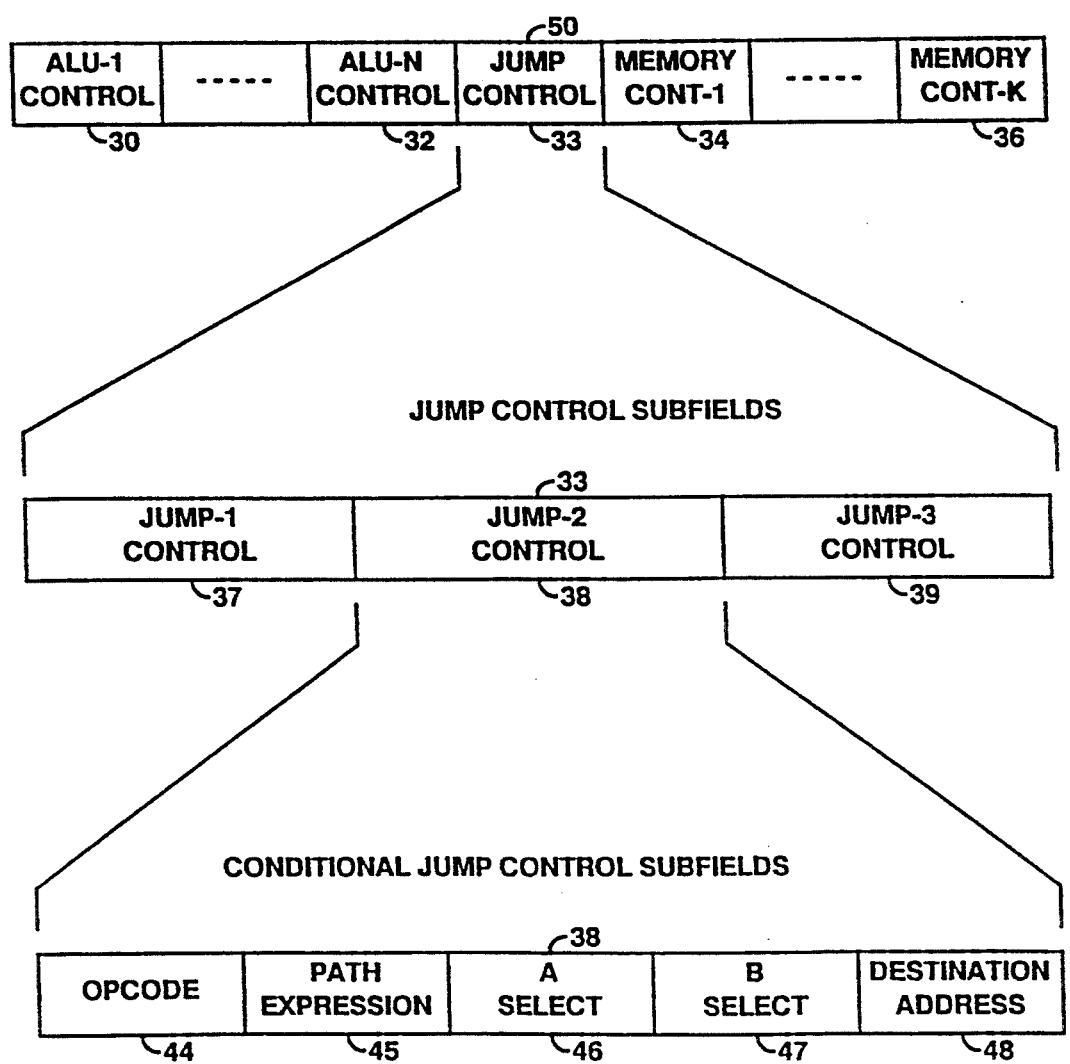

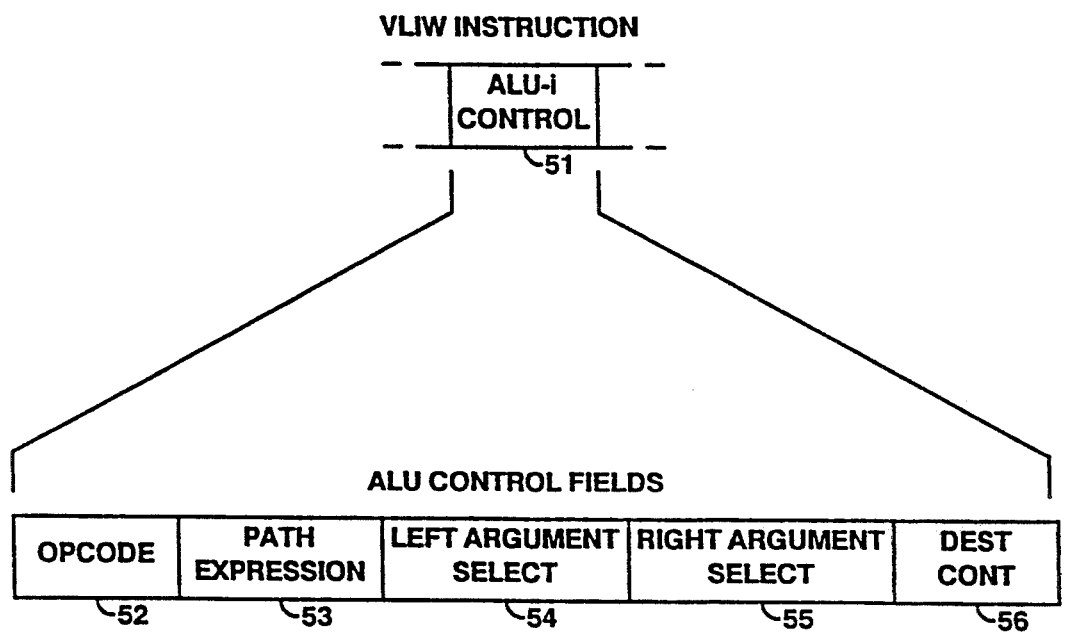
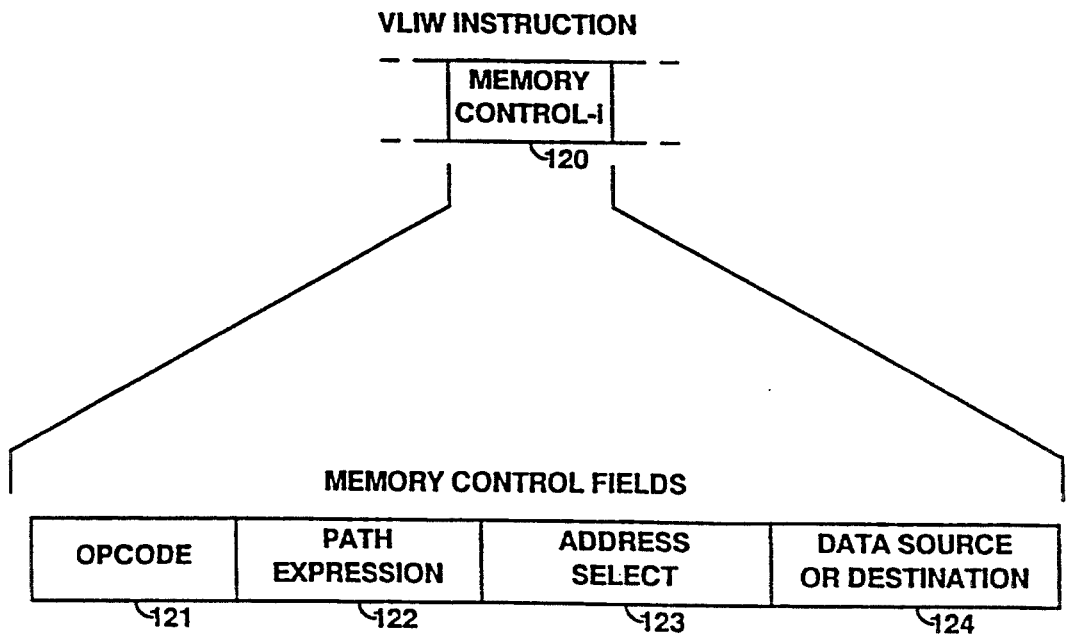

BRANCH CONTROL UNIT

MEMORY ACCESS CIRCUITS USING PATH EXPRESSIONS

MEMORY ACCESS CIRCUITS USING PATHSETS

VLIW PROCESSOR WHICH USES PATH INFORMATION GENERATED BY A BRANCH CONTROL UNIT TO INHIBIT OPERATIONS WHICH ARE NOT ON A CORRECT PATH

This is a continuation of application Ser. No. 07/578,976, filed on Sep. 5, 1990 abandoned.

BACKGROUND OF THE INVENTION

1. Field of the Invention

The invention relates to digital computers having at least some capability to perform two or more operations in parallel, and more particularly to a computer such as a pipelined system which is adapted to initiate at least one branching operation and at least one nonbranching operation in a machine cycle, and which may exhibit a branch delay of at least one machine cycle.

2. Description of the Related Art

It has become increasingly clear that the parallelism present in many ordinary non-numeric programs is fine-grain in that it is limited to a relatively confined portion of the program, i.e., parallelism is largely local. Parallel processing architectures, on the other hand, are at their best when handling programs with large scale, coarse grain parallelisms extending over processing steps of significant length, such as are found in many scientific problems and in communications processing. For these reasons, parallel processing architectures have proven to be ill-suited for speeding up the execution of many non-numeric or algorithmic programs.

One highly-parallel computer architecture called Very Long Instruction Word (VLIW) architecture has been proposed by J. A. Fisher in "Very Long Instruction Word Architectures and the ELI-512," *Proceedings of the 10th Annual Symposium on Computer Architecture*, June 1983, to exploit the modest fine-grain parallelism inherent in ordinary high level language programs. A VLIW machine consists of multiple independent functional units controlled on a cycle-by-cycle basis by a Very Long Instruction Word (100 or more bits). All of the functional units can be arbitrarily pipelined, i.e., they can start a new operation every cycle and take a fixed number of cycles to complete an operation, although the number of cycles for completion can vary from one functional unit to another. The pipeline stages of all units operate in lock step, controlled by a single global clock. The VLIW instruction is the concatenation of a plurality of operation subfields, one for each functional unit to be controlled.

All functional units are connected to a shared multiport register file from which they take their operands and into which they write their results. Any previously computed result can therefore be used as the operand for any functional unit. A VLIW instruction is loaded every cycle. Each functional unit is controlled during that cycle by its own control field which identifies the source and the destination locations in the multi-port register file, and the operation to be started. A typical architecture includes a plurality of arithmetic and logic units, a plurality of memory interface units and a branching control unit. All three of these types of functional units are pipelined to maximize the speed of operation. Any type of functional units can be provided, however, depending on the functions required for the particular application. Barrel shifters, multipliers, and any other functional units can be included provided they have a pipelined organization which permits an operation to be initiated every machine cycle. An "operation" in a VLIW machine is a primitive action taken by a single functional unit under control of the corresponding field of the VLIW instruction. A VLIW "instruction," then, is a concatenation of a plurality of such operation fields, to control the operation of all of the functional units in the architecture in parallel.

In order to efficiently program highly parallel machines such as VLIW machines, a compiler technique called trace scheduling has been used, as taught by R. P. Colwell et al. in "A VLIW Architecture for a Trace Scheduling Compiler," *Proceedings of ASPLOS*, 1987. A trace scheduling compiler takes as its input the instructions of a program and an execution profile indicating the likelihood of execution of each different path in the program. The trace scheduling compiler uses these inputs to construct a "trace" of the instruction path most likely to be executed. This trace is then scheduled to execute in parallel as much as possible, using all of the arithmetic and control units available in the VLIW machine.

For very high performance pipelined processors, including VLIW machines, a solution to the so-called "branch delay" problem is required. As a system is made faster by aggressive pipelining, the latency of the instruction memory increases. This latency is the time, in machine cycles, between the transmission of an instruction address to the instruction memory and tile receipt of that instruction from the instruction memory for execution. For a conditional jump operation, the time required to evaluate the branching conditions must be added to this latency time. The total time is called the "branch delay." The branch delay represents a number of machine cycles following a jump operation during which the execution of instructions is not affected by the outcome of the jump operation. In a high speed pipelined architecture, it is very undesirable to simply wait before continuing the execution of instructions.

One solution to the branch delay problem was suggested in "Highly Concurrent Scalar Processing," by P. Y-T. Hsu, Thesis, University of Illinois at Urbana-Champaign, 1986. His solution involves executing, during the branch delay period, all possible program paths in parallel (insofar as allowed by the limited number of functional units), but to "guard" each operation by means of a Boolean expression. Only the operations satisfying the Boolean expression are permitted to affect the state of the VLIW machine. Such Boolean expressions are constructed by the compiler in such a way as to insure that only those operations on the intended program path are executed. Hsu proposes to equip each functional unit with extra hardware to evaluate normal form Boolean expressions with a fixed number of factors, for example, three. This would allow the evaluation of expressions of the form a & b & c or a & $\bar{b}$ & c, etc., where the factors a, b and c are outcomes of three different jump condition evaluations. The hardware to evaluate such expressions is relatively simple. However, the cost of expanding the multiported register file with the read ports necessary to access all of the factors for each functional unit is prohibitive.

The problem, then, is to maximize the throughput of highly pipelined computer processor architectures, such as VLIW architectures, in the presence of significant branch delays. More particularly, the major problem with the prior art Boolean guard expression solution to the branch delay problem is the high cost of the larger multiported register file.

SUMMARY OF THE INVENTION

According to the invention, the above-described problems are overcome by incorporating in the computer central processor a branch control unit that provides an encoded representation of the condition evaluation outcome of all those branches that have issued but whose branch delay has not yet expired. This encoded representation is called the "path information" and is distributed to all functional units in the processor, including the branch control unit itself. The path information is matched against a path expression field associated with each selected operation to enable or disable the effect of that operation. The programmer or the compiler, by appropriate use of this path expression field, can ensure that only operations on the correct program path have their effect on the state of the machine. Hence, useful operations can now be placed in the branch delay interval of conditional branches, still ensuring the correct program behavior, since only those operations that match the conditions under which they should be executed are allowed to proceed.

In accordance with one aspect of the present invention, only those operations which result in changes to the programmer visible state of the machine need be provided with a path expression field. Such operations include assignments to variables (excluding the multiported register file in a VLIW machine), conditional jump operations and operations that may raise exception conditions. Other operations can be executed without affecting the final state of the machine.

In accordance with another aspect of the present invention, the path expression field can be encoded either so as to enable an operation on one and only one out of all possible active program paths, or so as to enable an operation on an arbitrary subset of all possible active program paths. In the latter case, the path expression field is called a pathset field.

A complete understanding of the present invention may be gained by considering the following detailed description in conjunction with the accompanying drawings.

BRIEF DESCRIPTION OF THE DRAWING

FIG. 2 shows the format of a typical very long instruction word suitable for the processor of FIG. 1, showing how a jump control field is decomposed into multiple jump control subfields for a machine with a four-way branch capability, and showing the presence of a path expression field for operations of the branch control unit itself;

FIG. 3 shows the format of a portion of a typical very long instruction word suitable for the processor of FIG. 1, showing how an arithmetic and logic control field is decomposed to show a path expression field;

FIG. 4 shows the format of a portion of a typical very long instruction word suitable for the processor of FIG. 1, showing how a memory control field is decomposed to show a path expression field;

To facilitate reader understanding, identical reference numerals are used to designate elements common to the figures.

DESCRIPTION OF THE PREFERRED EMBODIMENTS

The techniques of the present invention can be applied to any pipelined computer having a branch delay of more than one cycle. It will be described, however, in connection with a Very Long Instruction Word (VLIW) computer architecture for the purposes of illustration. It should be noted that this illustrative embodiment is not intended to be limiting in any regard, and that the inventive techniques can be applied to many other computer architectures by persons of ordinary skill in the art without departing from the spirit or scope of this invention.

Figure 1:
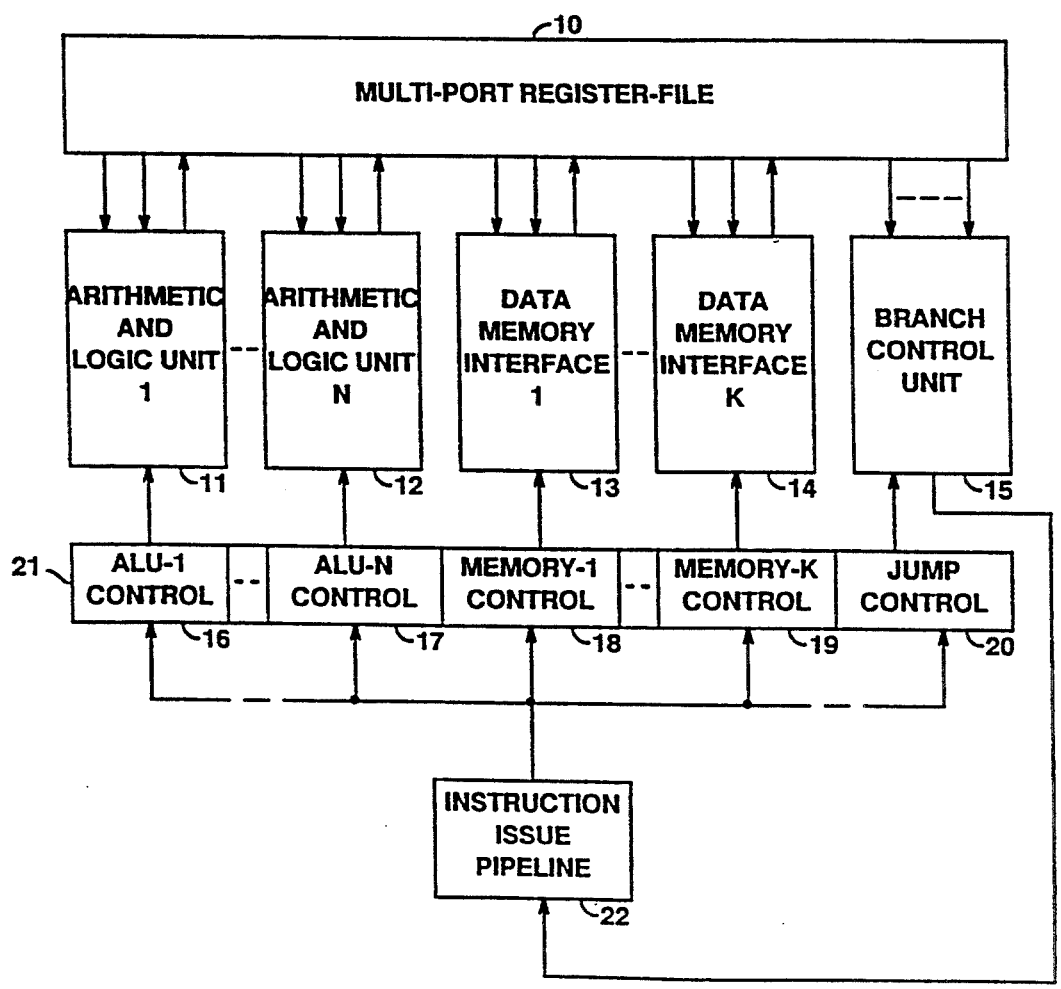
FIG. 1 shows a general block diagram of a highly parallel computer processor such as a very long word processor in which the conditional branching techniques of the present invention may find use.

FIG. 1 shows a general block diagram of a central processing unit for a very long instruction word (VLIW) computer architecture. The central processing unit of FIG. 1 comprises a multiport register file 10 used to communicate between a plurality of processor functional units 11 through 15. Register-file 10 is a universal access interconnection device for units 11–15 having storage capability for storing values between machine cycles. Such register files are well-known in the art, one being shown by S. Borkar et al in "iWarp: Integrated Solution to High Speed Parallel Computing," *IEEE Proceedings on Supercomputing*, pages 330–339, 1988 (IEEE Catalog #88CH2617-9). A Very Long Instruction Word instruction register 21 provides control fields to control the operation of each of functional units 11–15. The instructions placed in instruction register 21 are derived from an instruction issue pipeline 22.

The functional units 11–15 comprise a plurality N of arithmetic and logic units (ALUs) 11, . . . 12. The number of such ALUs is determined by the amount of parallelism which can be accommodated by the particular application but is typically on the order of between two and eight. A control field for each of the N ALUs is contained in each instruction in instruction register 21. Thus, control field 16 controls ALU 11 and control field 17 controls ALU 12. Each of ALUs 11–12 comprise standard and well-known circuits for performing a plurality of different arithmetic and logical operations on operands supplied to the ALU from register file 10. Since the structure and operation of such ALUs are well known and form no part of the present invention, they will not be further described here.

Also included in functional units 11–15 are a plurality K of data memory interface (DMI) circuits 13, . . . 14. The number of such DMI circuits is determined by the number of memory accesses which must be made on each machine cycle to accommodate the activities of the other functional units, typically on the order of one to five. A control field for each of the K DMI circuits is contained in each instruction in instruction register 21. Thus, control field 18 controls data memory interface 13 while control field 19 controls DMI 14. It is to be noted that DMIs 13–14 represent access ports to random access memory (RAM) units used to store data outside of the central processor of FIG. 1. Each of DMIs 13-14 may interface with a different data RAM, each may interface with a different port of a single data RAM, or the DMIs 13-14 may share access to single or multiple RAMs in common with the instruction issue pipeline 22. Each of these RAM memories can comprise a complex, high performance computer memory system organization using well-known memory techniques such as multi-banking, interleaving, etc., none of which are part of this invention. All that is necessary is that each instruction in instruction register 21 may contain up to K operations which reference a data memory for storing or accessing data. The operation of such data memory interfaces will be described in detail below in connection with FIGS. 6 and 7.

The last functional unit of the set 11-15 is branch control unit (BCU) 15. Branch control unit 15 responds to jump operations in the jump control field 20 of the instruction in instruction register 21. Jump operations contained in the jump control field 20 of a VLIW instruction are sent to branch control unit 15 where they are used, as will be described below in connection with FIG. 5, to control conditional branching to alternative paths of instructions in the program executing in the central processor of FIG. 1. To this end, branch control unit 15 generates the address entered into instruction issue pipeline 22 by determining which of a plurality of alternative instruction paths the central processor of FIG. 1 will follow, as determined by the conditions expressed in a conditional jump operation. Branch control unit 15 will be described in detail below in connection with FIG. 5.

The central processing unit of FIG. 1 is known as a very long instruction word (VLIW) processor because it includes a plurality of functional units 11-15, all of which are simultaneously controlled by the contents of a single instruction register 21. Thus, instruction register 21 has a plurality of fields 16-20 corresponding to and controlling the actions of unit 11-15, respectively. The multiport register file 10 performs the function of permitting interactions between the units 11-15 and providing buffer storage for operand values when necessary. If no operation can be scheduled for a particular functional unit 11-15 during a particular machine cycle, a NOP (no operation) code is entered in the control field for that functional unit.

PROGRAMMING

VLIW processor architectures such as that shown in FIG. 1 are well-known in the prior art and are programmed by compilers which generate the very long instruction words in such a manner as to optimize the overall throughput of the computer. Such prior art includes "An Efficient Algorithm for Exploiting Multiple Arithmetic Units," by R. M. Tomasulo, *IBM Journal of Research and Development*, Vol 11, pp. 25-33, January 1967; "Very Long Instruction Word Architecture and the ELI-512," by J. A. Fisher, *Proceedings of the 10th Annual International Symposium on Computer Architecture*, pp. 140-150, 1983; "Trace Scheduling: A Technique for Global Microcode Compaction," by J. A. Fisher, *IEEE Transactions on Computers*, Vol. C-30, pp. 478-490, July 1981; "Efficient Code Generation for Horizontal Architectures: Compiler Techniques and Architectural Support," by B. R. Rau et al., *Proceeding of the 9th Annual International Symposium on Computer Architecture*, pp. 131-139, 1982; "Highly Concurrent Scalar Processing," by P. Y-T. Hsu, Thesis, Coordinated Science Laboratory, College of Engineering, University of Illinois at Urbana-Champaign, January 1986; and "Some Design Ideas For a VLIW Architecture for Sequential-Natured Software," by K. Ebcioglu, *Proceeding of the IFIP Working Conference on Parallel Processing*, Pisa, Italy, April 1988.

One of the major problems encountered in programming aggressively pipelined computer processors is the conditional branch delay inherent in such architectures. If a condition (say a>b) is to determine the choice between two paths in a program, such as STATEMENT1 and STATEMENT2, the central processing unit must execute a conditional jump to the stored code for STATEMENT1 or STATEMENT2. Inherently, such a jump involves two delays in series, 1) evaluating the condition (a>b) and, once the outcome of the decision is known, 2) sending the instruction address of STATEMENT1 or STATEMENT2 into the instruction issue pipeline 22, where a certain instruction issue latency is incurred. Modern integrated chip implementations are able to evaluate the conditions very quickly. With heavily pipelined, multiple chip instruction issue pipelines, however, the latency of instruction retrieval can be substantial. That is, the time, in machine cycles, between the transmission of an instruction address to the instruction memory and the delivery of the corresponding instruction to the instruction register, can be several instruction execution cycles. Since the transferee instruction is not available during this branch delay period, it is difficult, if not impossible, to do useful work during the branch delay period. It is toward the alleviation of this problem that the present invention is directed.

When programming for highly parallel, multiple functional unit computer processor architectures, the necessary operations are expressed in serial form by the programmer. A compiler for such machines folds a large plurality of such operations into a single instruction word. The manner of accomplishing such folding is designed to maximize the amount of parallel processing taking place thus to maximize the throughput of the overall architecture. To accomplish this end, the operations associated in each instruction word do not necessarily correspond to the successive operations in the serial form of the program. Indeed, operations which depend on having the results of previous operations available must be scheduled in subsequent machine cycles. Nevertheless, significant savings in time can be accomplished by simultaneously performing a plurality of operations which do not depend on each other's output.

Special scheduling problems arise due to the branch delay of conditional jump operations. Several instructions are executed between the time that a jump operation specifies a conditional jump and the time that the destination instruction can be delivered to the instruction register. As previously described this is because of the time required to evaluate the jump conditions and the latency time of the instruction pipeline, i.e. the time between the delivery of an instruction address and the time the addressed instruction is delivered to the instruction register. It is a specific object of this invention to maximize the amount of work that can be done during this branch delay time. For the purposes of simplicity, the balance of the detailed description of the present invention will assume that the branch delay is two machine cycles. It will be apparent that the invention can be readily implemented for different branch delays by simple extensions of the teaching herein contained by any person of ordinary skill in the art.

Before proceeding to a detailed description of the structure and operation of branch control mechanisms of the present invention, it is first desirable to discuss the detailed structure of VLIW instructions as they relate to such branch control.

VLIW Instruction

FIG. 2 shows a graphical representation of the decomposition of the structure of a typical VLIW instruction 50 which might be stored in the instruction register 21 of FIG. 1. Instruction 50 comprises a plurality of fields 30 through 36 each containing separate operation control codes for a different functional unit of the central processor of FIG. 1. Thus, fields 30 through 32 control the arithmetic and logic units 11 through 12, respectively, of FIG. 1. Fields 34 through 36 control access to the data memory interfaces 13–14, respectively, of FIG. 1. Field 33 controls jumps in the normal program execution sequence. Field 33 consists of a plurality of subfields, one for each of a plurality of multiway branches permitted in the particular processor architecture. For the purposes of illustration, three jump control subfields 37–39 are shown in FIG. 2. Each jump control subfield (such as subfield 38), in turn, consists of five subfields 44–48. The OPCODE subfield 44 specifies the condition under which a jump to the address specified by the DESTINATION ADDRESS subfield 48 should take place. A typical, but by no means exhaustive, set of jump operation codes is shown in TABLE 1:

TABLE 1

| JUMP OPERATION CODES | |
|---|---|
| CODE | DESCRIPTION |
| 000 | Don't Jump |
| 001 | Jump if a < b |
| 010 | Jump if a ≦ b |
| 011 | Jump if a = b |
| 100 | Jump if a ≠ b |
| 101 | Always jump |
| 11X | Reserved Code |

In accordance with the present invention, The PATH EXPRESSION subfield 45 of FIG. 2 specifies the path or paths on which this jump operation should be enabled. That is, the jump operation will be executed and the jump specified will actually take place only when the OPCODE condition is met and the PATH EXPRESSION field 45 matches the path information to be described in connection with FIG. 5. Note that if both of these conditions hold for none of the three jump operations in fields 37–39, no jump occurs and the next sequential instruction is executed. Thus, each branching operation which specifies j explicit branch destinations actually determines a (j+1)-way branch, where the extra destination is the next sequential instruction.

SELECT subfields 46 and 47 identify the location of the two operands which are to be compared in order to determine if the OPCODE compare condition has been met. The contents of subfields 46 and 47 typically comprise the address of a register in the register file 10 of FIG. 1 in which the desired operand is stored. The last subfield 48 specifies the destination address of the instruction to which the transfer is to take place. For example, this destination can be specified as an absolute address, as an address relative to the current address in the program counter, as a register number in register file 10 where that register contains the absolute address, or by a base register number and an offset number where the absolute address of the destination is calculated as the sum of the address in the base register and the offset number.

FIG. 3 shows the decomposition of a typical arithmetic and logic control unit operation field 51 which forms a part of a VLIW instruction word. The ALU control field 51 is decomposed into an operation code subfield 52 which specifies what operation the arithmetic and logic unit is to perform. The path expression field 53 will be described in some detail later but, in general, conditions the execution of the operation based on path selection criteria to be explained below, just like the path expression field 45 of FIG. 2. Subfields 54 and 55 specify the location, in register file 10 (FIG. 1), of the two operands to be used in the operation specified by the operation code in subfield 52. Finally, subfield 56 identifies the destination, in register file 10, to which the results of the operation are to be directed.

In FIG. 4 there is shown the decomposition of a typical memory control field 120 which forms part of a VLIW instruction word. The field 120 is decomposed into an operation code subfield 121 which is used to specify whether a read operation is to occur or a write operation. The path expression subfield 122 performs a function similar to the path expression fields 45 and 53 in FIGS. 2 and 3, respectively, and will be discussed further below. Subfield 123 specifies the address in memory from which data is to be taken (on a read) or to which data is to be delivered (on a write). Subfield 123 can, just like subfield 48 of FIG. 2, identify such an address in many ways, for example (but not limited to), as an absolute address or as an offset, relative to the content of a specified register in register file 10 (FIG. 1). Subfield 124 identifies the register in register file 10 (FIG. 1) to which data is to be delivered (on a read) or from which data is to be taken (on a write). For a read operation, data is taken from the RAM data memory and delivered to the register file 10. For a write operation, data is taken from the register file 10 and delivered to the RAM data memory.

The VLIW instruction word organization shown in FIGS. 2–4, as well as the VLIW architecture shown in FIG. 1, have been chosen to illustrate the present invention because they are simple and readily understood. It should be apparent, however, that alternative organizations are possible, such as sharing fields between ALU operations and DMI operations and adding different types of functional units such as barrel shifters and multiplier units. Such alternative organizations are just a readily adaptable to the use of the present invention, but would unduly complicate this description. Since the specific organization of the highly parallel, pipelined processor, and of the instruction words used to drive that processor, form no part of the present invention, the disclosed simplified organizations have been chosen to illustrate the invention.

Branch Control Unit

Figure 5:
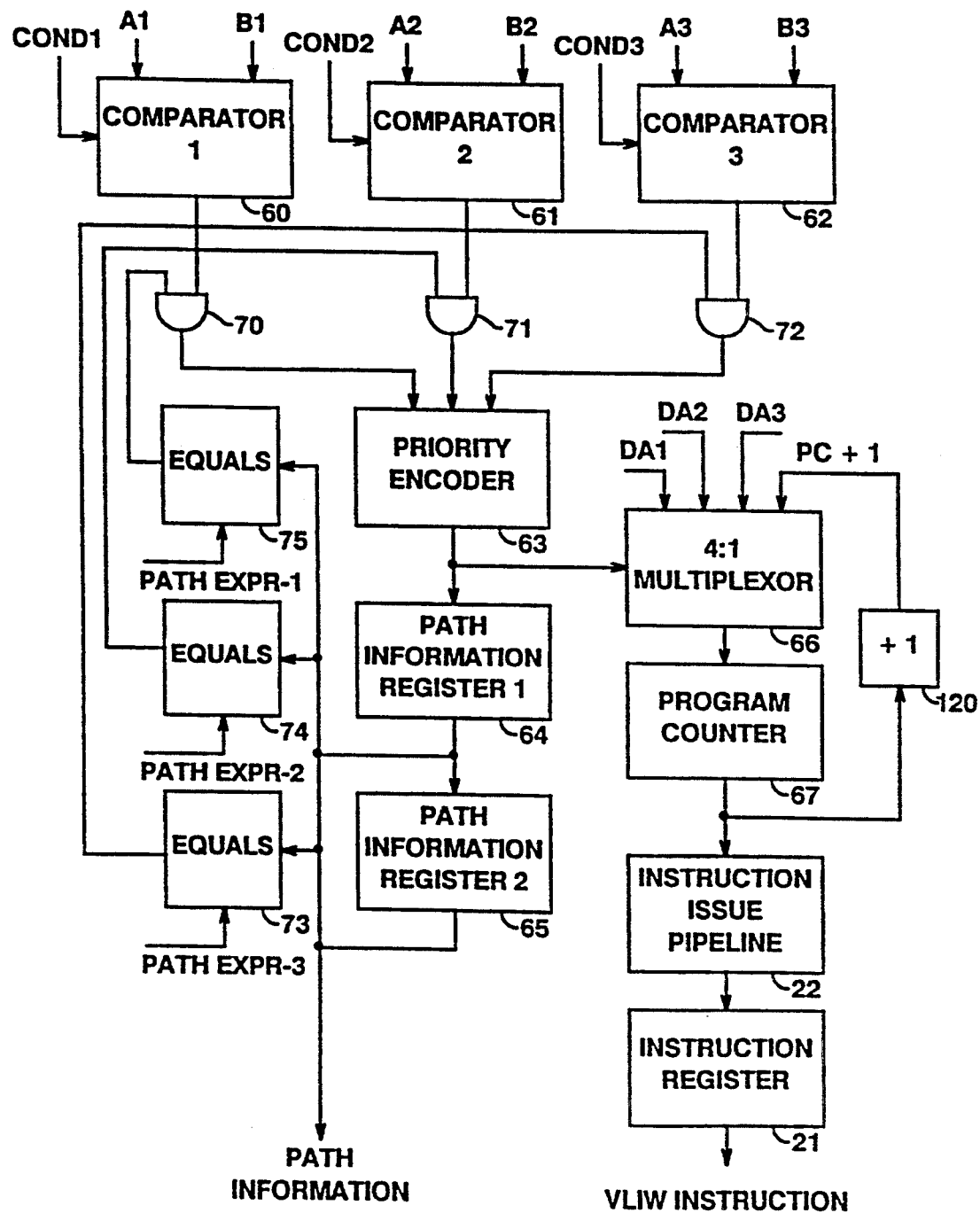
FIG. 5 shows as branch control unit in accordance with the present invention for use in the parallel processor of FIG. 1.

FIG. 5 shows a detailed block diagram of the branch control unit 15 of FIG. 1. The branch control unit performs all of the control functions necessary to execute a conditional jump operation such as that shown in FIG. 2. It is assumed, for the purposes of simplicity, that the same four-way branches of FIG. 2 are accommodated in the control circuit of FIG. 5. Furthermore, it is assumed that the "branch delay" is equal to two machine cycles. That is, it is assumed that two machine cycles elapse from the time an instruction address is sent to the instruction issue pipeline 22 (FIG. 1) and the time the addressed instruction is present in instruction register 21.

Since three destinations and three OPCODE conditions are specified in the conditional branch operation 33 of FIG. 2, three comparator units 60, 61 and 62 are provided to make the three comparisons necessary to evaluate the branch conditions. The A-select and B-select fields 46 and 47 of the condition portion of the conditional branch operation serve to locate and gate the A1, A2, A3, B1, B2 and B3 values from the register file 10 of FIG. 1 into the appropriate ones of comparator units 60–62. Comparator units 60–62 are capable of implementing any of the basic compare conditions given in Table 1 (e.g., $<$, $\leq$, $=$ and $\neq$) and encoded in the OPCODE in subfield 44 of FIG. 2. That is, the coded conditions are applied to the comparators 60–62 to select the appropriate comparisons for this particular conditional branch path. The results of all three comparisons are fed through AND gates 70, 71 and 72, respectively, to priority encoder circuit 63. AND gates 70–72 combine the result of the jump condition evaluation with the outcome of the path information match, to be discussed below. A TRUE output on one (or more) of the gates 70–72 results in a jump being taken. It would be possible to design the compiler such that the three jump conditions are always mutually exclusive. In the present embodiment, however, the jump conditions are not mutually exclusive, and priority encoder 63 chooses the highest priority jump. Encoder 63 generates a 2-bit output signal which instructs the multiplexer 66 to connect the appropriate input to the program counter register 67. The operation of the priority encoder 63 and multiplexer 66 is detailed in Table 2 below:

TABLE 2

| JUMP CONDITION TRUTH TABLE | | | | | |
|---|---|---|---|---|---|
| AND GATE 70 | AND GATE 71 | AND GATE 72 | CKT 63 OUT | MUX 66 OUT | COMMENT |
| TRUE | X | X | 01 | DA1 | JUMP1 Condition True and on path |
| FALSE | TRUE | X | 10 | DA2 | JUMP1 Fails, Jump2 True and on path |
| FALSE | FALSE | TRUE | 11 | DA3 | JUMP1 and JUMP2 Fail JUMP3 True and on path |
| FALSE | FALSE | FALSE | 00 | PC + 1 | All Jumps Fail, Continue straight ahead |

As shown in the table 2, the new value loaded into the program counter 67 is the desired result. The highest priority jump whose conditions evaluate true, and whose path information matches, has its address latched in the program counter register 67. If none of the jumps satisfy the comparison condition, program counter 67 is loaded with the next sequential address. The output of program counter 67 is applied to the instruction issue pipeline 22 (also shown in FIG. 1) and, after the two cycle latency period, results in the appropriate instruction being loaded into instruction register 21. Element 22 is pipelined in the sense that an address can be sent into element 22 every cycle, and the corresponding instruction comes out of the combination of elements 22 and 23 after a latency of two cycles. The instruction issue pipeline 22 can be a specialized instruction-only memory consisting of higher Read Only Memory (ROM) or Random Access Memory (RAM) components, or it can be another port to a memory system shared in common with ports used in data memory interfaces 13–14 of FIG. 1.

The output of priority encoder 63 is delayed for two successive cycles by registers 64 and 65. The concatenated (and hence four bits) output of registers 64 and 65 form the path information, i.e., the encoded outcome of the two most recent jumps, whose effect has not yet percolated through the instruction pipeline consisting of elements 22 and 21 referred to herein as "pending" jumps. This path information is used in all functional units including the branch control unit itself to implement the path expression matching operation.

The "EQUALS" comparators 73–75 implement the matching operation according to the first embodiment of the present invention (where an operation is allowed to specify a path expression code for a single program path) for the three jump control operations of FIG. 2. The equality comparators 73–75 will produce a TRUE output if (and only if) the path information output of registers 64 and 65 matches the path expression field 45 (FIG. 2) of the corresponding jump control subfield.

Figure 7:
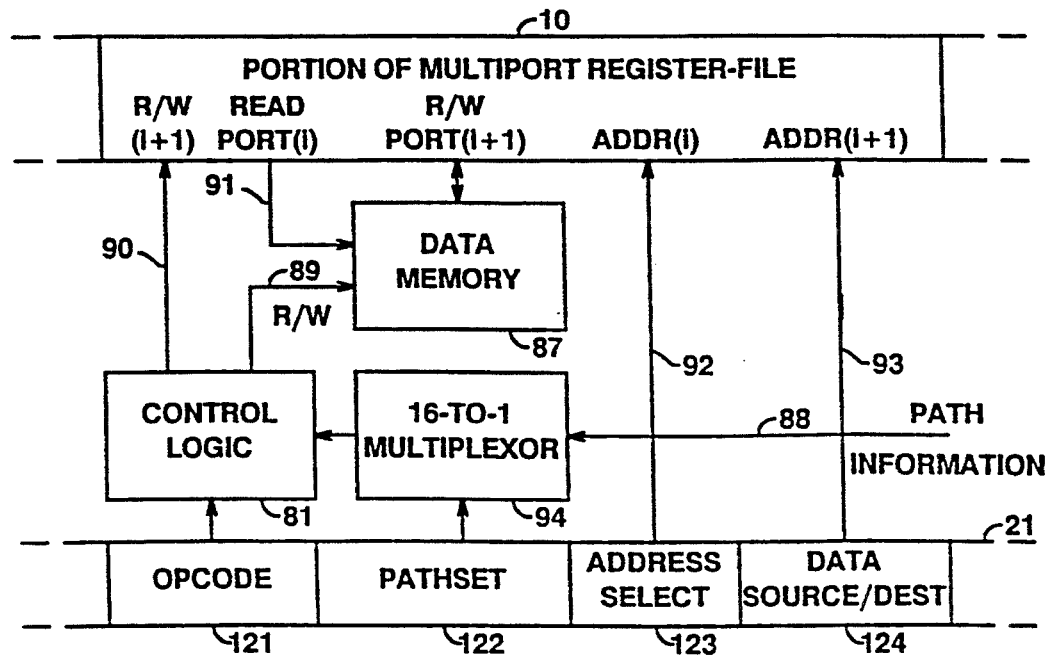
FIG. 7 shows the memory interface control circuits which use a path set field to condition the access to the memory of a highly parallel processor in accordance with the present invention.

The circuit consisting of equality comparators can be modified to handle matching according to the second embodiment of the present invention (where an operation can specify a set of paths on which it should be executed) by using three 16-to-1 multiplexers instead of the comparators 73–75, as described below with reference to FIG. 7.

It can be seen that the branch control unit of FIG. 5 operates to perform all of the necessary comparisons to determine the outcome of every conditional jump operation and to encode the result of such comparisons as path information. At the same time, the branch control unit of FIG. 5 also serves to generate appropriate addresses in the program counter to permit access to the appropriate "next" instruction following a conditional jump operation. The mechanism for ensuring the execution of operations in one, and only one, of the program branch paths will be taken up in connection with FIGS. 6 and 7. The mechanism, however, is similar to that of FIG. 5 for conditioning the execution of the conditional jump operation itself.

It will be noted that two or more conditional branch operations may directly follow each other in successive instruction cycles of the program, either as a result of failure to jump or as a result of a jump actually taking place. If conditional jump operations do follow each other in successive instruction cycles, the possible number of destinations after the the instruction cycle branch delay is the product of the number of possible destinations in the first conditional jump operation multiplied by the number of possible destinations in the second conditional jump operation. The path information from registers 64 and 65 encodes all of these possibilities since this path information represents the results of jump outcomes of the two most recent instructions.

The path information from the branch control unit of FIG. 5 is used to condition the execution of operations in all of the possible paths which might be selected by the jump operations. It is only necessary, however, to condition the execution of operations which produce a result visible to the programmer. Memory storage operations, such as that shown in FIG. 4, are the most obvious ones of such operations and hence each such memory store operation includes a path expression field (subfield 122 in FIG. 4). Other conditional jump operations, however, can also affect the programmer-visible state of the computations and hence also include a path expression subfield 45, as shown in FIG. 2. Not so obvious, but equally important, are the so-called "exception raising" operations, such as arithmetic overflow, which may also change the program control flow. Hence even the ALU operations include a path expression subfield 53 to permit path selection, as shown in FIG. 3. The path information code is used to enable only those operations which correspond to the program path selected by conditional jump operations that have issued but whose effect has not yet percolated through the instruction issue pipeline.

It is clear that, if the branch delay is n machine cycles and the maximum number of jump control subfields in each conditional branching operation is k, then the number of bits needed to encode the identification of the selected one of the branch paths is given by $$n \cdot \log_2(k+1)$$

where $\log_2$ is the logarithm to the base two. For the two cycle branch delay and three jump control subfield assumptions of FIG. 5, four bits are required to encode the identification of the program path. This code is called the path expression since it identifies the one out of sixteen possible program paths selected as a result of two successive conditional jump operations.

It is sometimes possible to schedule operations which are shared by more than one branch path. In that case, it is desirable to enable the operation if two or more of the possible paths are selected. In order to specify all of the possible paths (rather than just one), the number of bits required is given by $$2n \cdot \log_2(k+1)$$

where n and k are defined as above. For a two cycle branch delay and a four-way jump operation, sixteen bits are required to identify any subset of the up to sixteen different paths. This code is called the "pathset" code and two or more bits of this code can be set to enable a particular operation in two or more different paths. The embodiments of the present invention disclosed in connection with FIGS. 6 and 7 utilize path expression codes and pathset codes, respectively.

Memory Access

Figure 6:
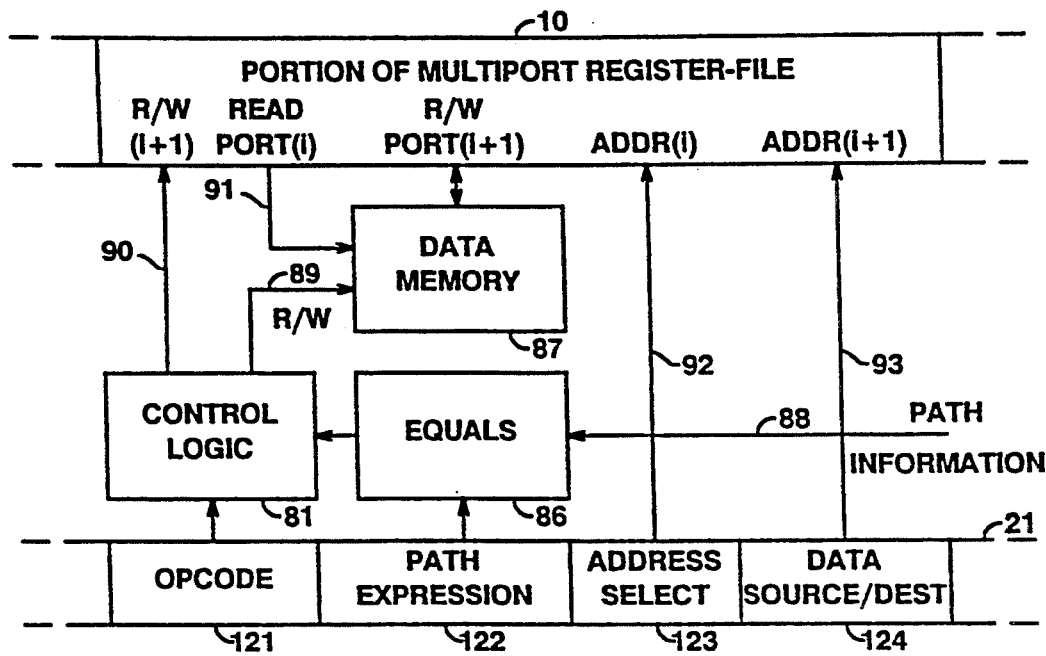
FIG. 6 shows the memory interface control circuits which use a path expression field to condition the access to the memory of a highly parallel processor in accordance with the present invention.

Referring then to FIG. 6, there is shown a graphical representation of the memory access circuitry of data memory interfaces 13-14 of FIG. 1. As previously noted, write operations executed on the data memory interfaces 13-14 of FIG. 1 are capable of modifying the state of the system which is visible to the programmer. The execution of these write operations must therefore be enabled (or disabled) by path information collected from the previous two machine cycles. FIG. 6 shows the fields 121-124 of instructions in instruction register 21 associated with a data memory interface functional unit such as units 13-14 of FIG. 1. These fields include an operation code field 121, which specifies either read or write, a path expression field 122, which identifies on which program path this operation is to be enabled, and an address select field 123 specifying the memory address from which data is to be taken (on a read) or to which data is to be delivered (on a write). In the embodiment of FIG. 6, the address select field 123 is nothing but the identification of a register in register file 10 that contains the address. Also included in the fields in instruction register 21 is a data source/destination subfield 124 which identifies the register in register file 10 to which or from which data is delivered.

In FIG. 6, the port to an actual RAM memory is shown as data memory 87. An address is supplied to memory 87 by way of leads 91 while data is supplied to or taken from memory 87 at the top of the box 87. A control input on line 89 determines whether a read operation is to take place from the memory or a write operation to the memory. The path information from FIG. 5 is supplied on leads 88 to an equality compare circuit 86. Also supplied to equality circuit 86 is the content of the path expression subfield 122 of the memory control operation in instruction register 21. If the content of the path expression field is equal to the path information, then a memory write operation is to be enabled. To this end, the output of compare circuit 86 is applied to one input of control logic circuit 81, the other input of which is the operation code from field 121 of the memory control operation in instruction register 21. One output of control logic circuit 81 is the read or write enable signal on lead 89. Control logic circuit 81 also supplies a control signal on lead 90 which controls the direction of data movement to the multiport register file 10. The details of the control logic circuit 81 depend on the timing requirements for the control signals on leads 90 and 91 and hence are not shown in FIG. 6. Such logic design is routine to any person skilled in the art and forms no part of the present invention.

For the particular example of FIG. 6, it is assumed that field 123 specifies a register in register file 10 in which the address of the memory operation is to be found. Hence field 123 directly forms the address to the readport(i) of the multiport register file 10 on lead 92. The output of the readport(i) forms the address to data memory 87 over leads 91. Field 124 identifies the register in register file 10 where data is to be taken from (on a read operation) or written to (on a write operation). Hence field 124 is used as an address to read/write port(i+1) of register file 10. The data from memory to port(i+1) or from port(i+1) to memory is transported over the leads shown at the top of data memory 87. The circuitry of FIG. 6 can easily be expanded by anyone skilled in the art to utilize other memory addressing techniques, such as base plus offset addressing. The operation of the circuit of FIG. 6 is such that memory write operations (and, if desired, also memory read operations) are conditioned by the match of the path expression field 122 of the read or write operation and the path information supplied from the branch control unit of FIG. 5 on leads 88.

It is sometimes desirable to enable an operation on more than one path that can be active at a given time. In that case, the variation shown in FIG. 7 can be used. FIG. 7 shows the same circuitry as that of FIG. 6 except that the equality comparator 86 has been replaced by a multiplexer 94. The pathset field 122 is a sixteen bit field that can specify an arbitrary subset of paths on which the memory operation should be enabled. The circuit operates to accomplish this result by the multiplexer 94 connecting one of sixteen inputs from the pathset field 122 to the output of multiplexer 94, depending on the code on path information leads 88. The presence of a "1" bit at the particular location in the pathset field 122 will determine whether or not the operation is enabled for that particular pathset code. By selectively setting the bits of the pathset code, any subset of all possible active paths (including the empty subset and the full set) can be chosen.

It can be seen that the path expression fields or the pathset fields in operations following a conditional branch operation determine whether or not such operations are actually executed for a given outcome of branch conditions which have been issued but not yet percolated through the instruction issue system. In particular, for the case of the illustrative embodiments with a two cycle branch delay and a four-way branching ability, an operation scheduled in cycle i can be conditioned to execute only if the jump in cycle (i−2) went in direction "1" (binary "01") and the jump in cycle (i−1) went in direction "3" (binary "11") by assigning it the binary path expression value "0111" (the binary code for direction "1" followed by the binary code for direction "3"). This permits the compiler to move such operations as were intended to be at the destination of branch operation (i−1) to cycle i instead of having to place them in cycle (i+2). Hence it is possible to utilize the branch delay cycle times while at the same time guaranteeing that a program will produce the same effect on the programmer-visible state of the machine. The cost of the circuitry of the present invention is minimal; two registers of two bits each are added to the branch control unit of FIG. 5 and, in addition, as many binary equality detectors are needed as the machine has parallel operations. The only other cost involves the AND gates 70–72 of FIG. 5 and the logic circuitry 81 of FIG. 6 or 7.

It should also be clear to those skilled in the art that further embodiments of the present invention may be made without departing from the teachings of the present invention.

What is claimed is:

1. A very long instruction word (VLIW) processor, for executing a program comprising a multiplicity of operations including at least one conditional branching operation, a result of the conditional branching operation determining a correct path through the program, the processor comprising an instruction register for storing a very long instruction word, the word including a plurality of fields for specifying
a plurality of operations from the program, the operations specified by the instruction word to be begun in a same machine cycle; and
at least one path expression, the path expression being associated with at least one associated operation which associated operation is one of the operations specified by the instruction word;
a plurality of functional units for executing the operations specified by the instruction word, at least one of the functional units operating in a pipelined manner, at least one of the functional units being a branch control unit for executing the at least one conditional branching operation, the branch control unit maintaining and generating current path information indicating the correct path, execution of the at least one conditional branching operation resulting in a respective branch delay;
means, cooperating with the at least one of the functional units, for inhibiting at least one currently executing operation from affecting a programmer visible state of the VLIW processor, said means for inhibiting acting in response to and by comparing the current path information and the path expression, so that
only the operations specified by the instruction word that are on the correct path affect the programmer visible state, and
the operations, specified by the instruction word, that begin execution in the functional units prior to expiration of the branch delay and that are not on the correct path, do not affect the programmer visible state.

2. The VLIW processor of claim 1 wherein the means for inhibiting uses one bit of the current path information to select one bit of the path expression for determining whether or not to inhibit.

3. The VLIW processor of claim 1 wherein the means for inhibiting comprises means for comparing all bits of one of the at least one path expression with the current path information.

4. The VLIW processor of claim 1 wherein the means for inhibiting prevents a write to a memory.

5. The VLIW processor of claim 1 wherein the means for inhibiting prevents a write back to a processor register.

6. The VLIW processor of claim 1 wherein the means for inhibiting prevents execution of a branching operation.

7. The VLIW processor of claim 1 wherein the instruction word has a respective field for specifying a respective path expression for each of the operations, specified by the instruction word, that affect the programmer visible state of the VLIW processor.

8. The VLIW processor of claim 7 wherein the instruction word includes a respective path expression for each of the operations specified by the instruction register.

9. The VLIW processor of claim 1 wherein the path expression can specify one and only one program path which does not inhibit execution of the associated operation.

10. The VLIW processor of claim 1 wherein the path expression can specify an arbitrary number of program paths which do not inhibit execution of the associated operation.

11. The VLIW processor of claim 1 wherein the instruction register specifies a respective path expression for each operation following the conditional branching operation.

* * * * *